Patented Oct. 21, 1947

2,429,264

UNITED STATES PATENT OFFICE 2,429,264

DRYING ROSIN OIL AND METHOD OF PRODUCING SAME

Elmer E. Fleck, Silver Spring, Md., assignor to the United States of America, as represented by the Secretary of Agriculture No Drawing  Application November 27, 1945, Serial No. 631,196

2 Claims. (Cl. 260—106)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This application is a continuation in part of my copending application for patent, Serial No. 466,705, filed November 23, 1942.

This invention relates to rosin products, and has for its object a process of treating a rosin in a simple and efficient manner to produce a rosin product which will dry.

The rosin product hereinafter referred to as a drying rosin oil is produced by the treatment of natural rosins, such as gum or wood rosins, with a strong sulfuric acid, at an elevated temperature under atmospheric pressure, by slowly adding the acid and stirring the reaction mass, and subsequently heating the reaction product over an interval at a yet higher temperature to reduce the acid number of the product. The following outline, using sulfuric acid, illustrates the process and ranges:

Rosin _____ 100 parts
Sulfuric acid (specific gravity 1.84) (by weight) (5 parts preferred) _____ 1 to 10 parts
Reaction temperatures (200° preferred) ____ 180° to 200° C.
Reaction time (2 hrs. preferred) _____ 2 hrs. to no upper limit
Subsequent heating temperature (260° to 270° C. preferred) _____ 255° to 325° C.
Subsequent heating time (2 to 3 hrs. preferred) _____ 2 hrs. to no upper limit The mixture of resin acids found in rosin consists of isomeric compounds of the formula $C_{20}H_{30}O_2$. These resin acids contain two unsaturated groups each, but the oxidation of these unsaturated groups leads to brittle, colored products and not to a film of the type formed by the oxidation of drying oils.

The exact mechanism of the action of sulfuric acid on rosin at high temperatures is not well understood. It is known, however, that during the course of the reaction, carbon dioxide, water, sulfur dioxide, free sulfur, hydrogen sulfide and probably some methyl mercaptans are formed and eliminated from the reaction mixture. The final product is almost completely soluble in petroleum ether. Analysis of the acid-treated rosin by the perbenzoic acid method shows that the total unsaturation of the product is somewhat lower than that of the rosin, although this decrease is not great. The acid number of the final product depends upon the length of time the product is heated at temperatures of about 275° C. The product is a viscous oil when the acid number is around 70 or lower.

It is believed that the action of the sulfuric acid in the present invention is one of rearranging the unsaturated groups in the resin acid molecules to give a product more suitable for film formation during the drying process, and that this takes place at the reaction temperature of about 200° C. A further function of the sulfuric acid treatment is the elimination of the acid group contained in the resin acid molecules. This takes place at the subsequent heating temperatures above 260° C.

The drying rosin oils of this invention form a dry film when exposed to ultra-violet light or to direct sunlight for 10 to 15 hours. A thin film of drying rosin oil will remain sticky for about a month when exposed to air out of the direct sunlight, but its drying properties can be accelerated by the addition of commercial paint driers so that drying takes place in the dark as rapidly as in direct sunlight.

This drying rosin oil may be used in commerce as a drying oil in the manufacture of paints or varnish. When used as a varnish, the film formed shows semi-waterproof properties. Drying rosin oil also may be used in calking material, since it will surface-harden where exposed to air and remain plastic in the thicker portion of the calking compound. Drying rosin oil is miscible with other drying oils and may be blended with these oils in the manufacture of paints and varnishes.

A few illustrative examples of the process are given below.

Example I

Two hundred sixteen grams of longleaf rosin was heated to 200°±5° C. and stirred rapidly while 4 cc. of sulfuric acid (specific gravity 1.84) was added in a thin stream. Strong evolution of gas took place during the addition of the sulfuric acid. Heating and stirring were continued for two hours. The temperature of the reaction was then raised to 260°–270° C., and this temperature was held for two hours. The entire process was carried out under atmospheric pressure.

The resulting product, when cooled to room temperature, was a dark viscous liquid free from sulfur. Its acid number was 57 and its unsaturation, determined by the perbenzoic acid method, corresponding to an iodine number of 136.

Example II

Two hundred grams of slash rosin was treated with sulfuric acid under substantially the conditions of Example I, except that the reaction time was raised to five hours and the subsequent heating time to three hours.

The final product had an acid number of 77 and an unsaturation, determined by the perbenzoic acid method, corresponding to an iodine number of 119.

*Example III*

Two hundred grams of wood rosin, N grade, was treated with sulfuric acid under substantially the conditions of Example II.

The final product had an acid number of 73 and the unsaturation, determined by the perbenzoic acid method, corresponding to an iodine number of 121.

Having thus described my invention, I claim:

1. A process comprising slowly adding sulfuric acid to rosin and stirring at atmospheric pressure and heating at a temperature of from 180° to 200° C. for a period of not less than two hours, the ratio of rosin to sulfuric acid being 100 parts to from 1 to 10 parts by weight, and subsequently raising the temperature to from 255° to 325° C. for a period of not less than two hours.

2. A process comprising slowly adding sulfuric acid to rosin and stirring at atmospheric pressure and heating at a temperature of approximately 200° C. for a period of approximately two hours, the ratio of rosin to sulfuric acid being 100 parts to approximately 5 parts by weight, and subsequently raising the temperature to approximately 265° C. for a period of approximately two to three hours.

ELMER E. FLECK.

REFERENCES CITED

The following references are of record in the file of this patent:

FOREIGN PATENTS

| Number | Country | Date |
|---|---|---|
| 17,532 | Great Britain | 1912 |
| 337,750 | Great Britain | Oct. 24, 1930 |